United States Patent [19]
Bishop

[11] 4,019,780
[45] Apr. 26, 1977

[54] DUMP TRUCK BED
[75] Inventor: Jerald W. Bishop, Osborne, Kans.
[73] Assignee: Gilmore-Tatge Manufacturing Co., Inc., Clay Center, Kans.
[22] Filed: Nov. 19, 1975
[21] Appl. No.: 633,423
[52] U.S. Cl. ............................ 298/11; 298/13; 298/22 P
[51] Int. Cl.² ............................ B60P 1/34
[58] Field of Search .......... 298/11, 12, 22 P, 18, 298/13

[56] References Cited
UNITED STATES PATENTS

| | | | |
|---|---|---|---|
| 2,542,799 | 2/1951 | Day | 298/11 |
| 3,066,984 | 12/1962 | Hori | 298/11 |
| 3,083,058 | 3/1963 | Walstrom | 298/22 P X |
| 3,844,617 | 10/1974 | Kostman | 298/11 |

Primary Examiner—L. J. Paperner
Assistant Examiner—George F. Abraham
Attorney, Agent, or Firm—John A. Hamilton

[57] ABSTRACT

A dump truck bed including a tiltable dump bucket adapted to dump its load laterally of the bed, and mechanism operable to elevate it to any desired elevation within a substantial range before dumping, whereby its load may be dumped into high truck beds or other higher receptacles, and to move said bucket laterally of the bed in the direction of dumping, whereby its load may be dumped into receptacles further from the side of the bed.

5 Claims, 7 Drawing Figures

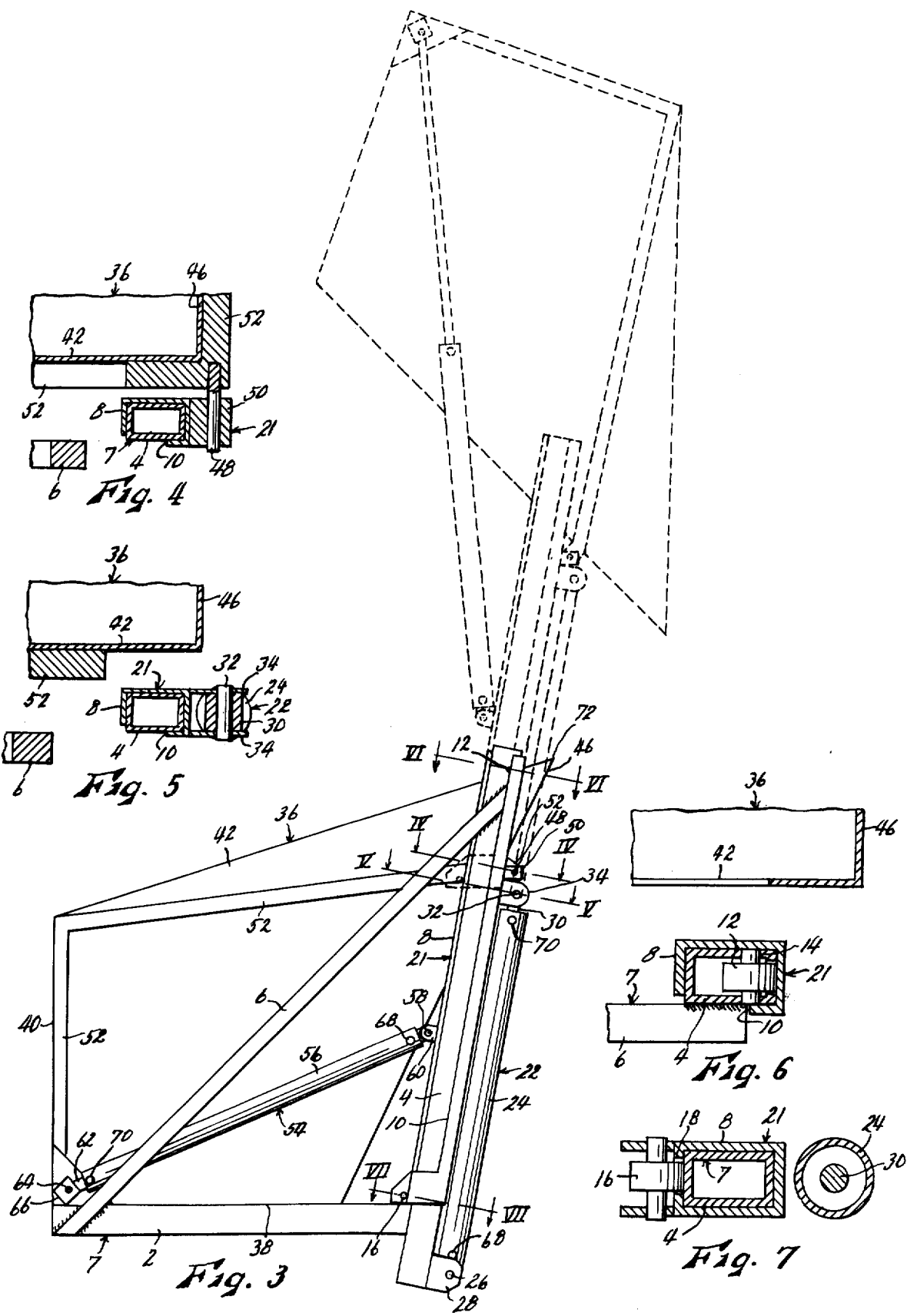

DUMP TRUCK BED

This invention relates to new and useful improvements in dump trucks, and has particular reference to a dump truck bed adapted to be mounted on any suitable truck chassis.

A particular object of the present invention is the provision of a dump truck bed in which is included a dump bucket tiltable to discharge its load, and including means operable to elevate said dump bucket bodily before dumping, to any desired position within a substantial range of elevations. In this manner, the normal height of the dump truck may be retained within safe limits dictated by roadability and good stability, while at the same time it may be elevated sufficiently to dump its load into high truck beds or other highly placed receptacles.

Another object is the provision of a dump truck bed of the character described in which the bucket is adapted to dump its load laterally of the direction of travel of the truck, and wherein said bucket, as it is elevated, is also moved bodily laterally of the bed, in the direction of dumping. In this manner, the bucket contents may be deposited in receptacles spaced laterally farther away from the dump truck, eliminating the necessity of carefully jockeying the dump truck to bring it extremely close alongside the receiving receptacle, as is often the case with present dump trucks.

Other objects are simplicity and economy of construction, and efficiency and dependability of operation.

Figure 1:
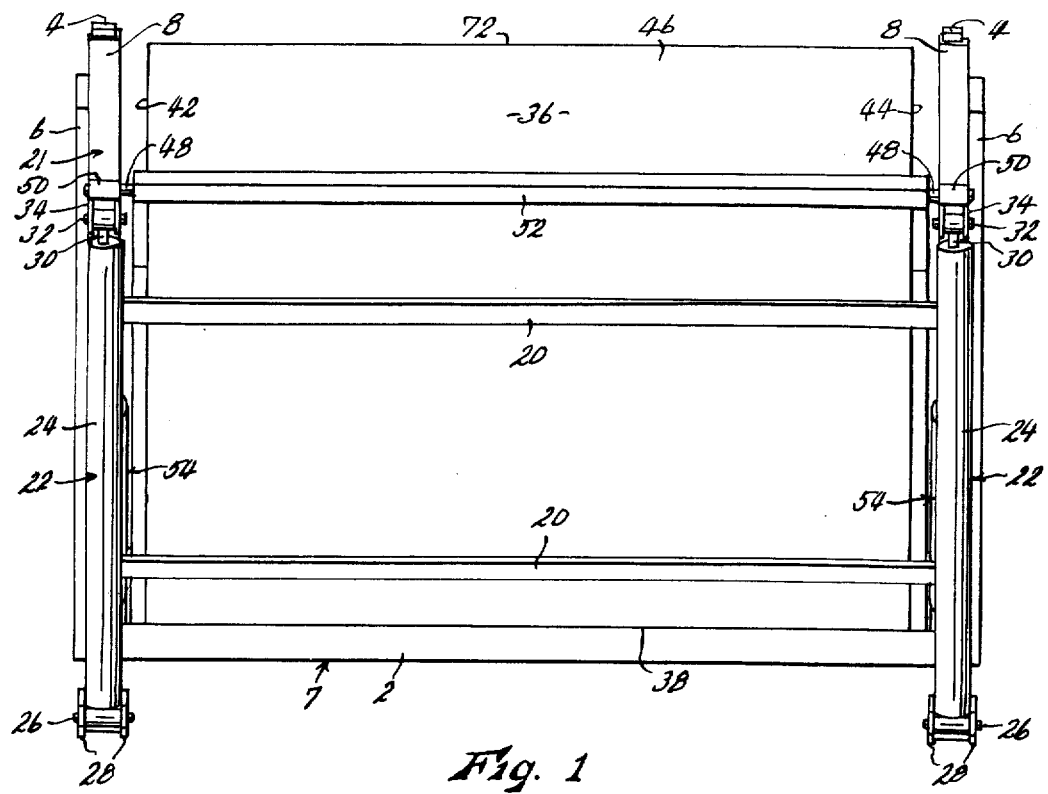
Figure 2:
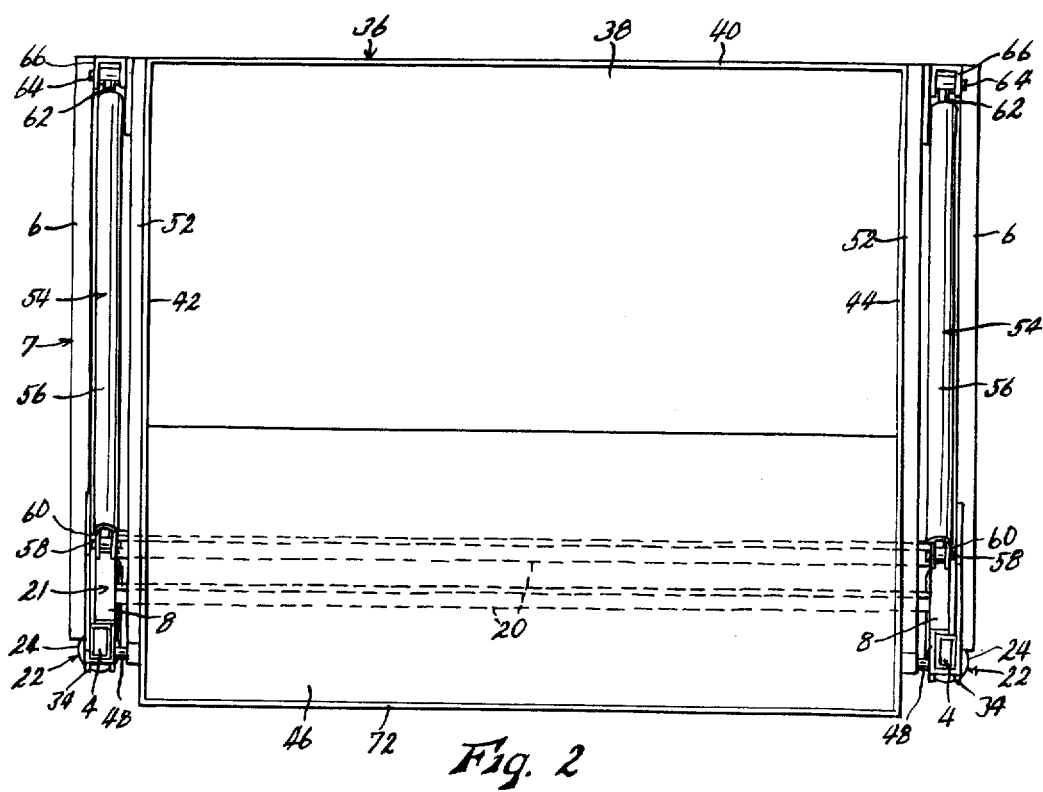

With these objects in view, as well as other objects which will appear in the course of the specification, reference will be had to the accompanying drawing, wherein:

FIG. 1 is a left side elevational view of a dump truck bed embodying the present invention, FIG. 2 is a top plan view of the dump truck bed as shown in FIG. 1, FIG. 3 is a front elevational view of the dump truck bed, showing the dump bucket in its normal lowered, upright position in solid lines, and in a dump position in dotted lines, FIG. 4 is an enlarged, fragmentary sectional view taken on line IV—IV of FIG. 3, FIG. 5 is an enlarged, fragmentary sectional view taken on line V—V of FIG. 3, FIG. 6 is an enlarged, fragmentary sectional view taken on line VI—VI of FIG. 3, and FIG. 7 is an enlarged sectional view taken on line VII—VII of FIG. 3, Like reference numerals apply to similar parts throughout the several views, and the numeral 2 applies to the base of the dump truck bed. Said base constitutes a substantially rigid, planar rectangular frame disposed horizontally and formed of welded beams or the like, although the specific structure thereof is not pertinent to the present invention, and is not shown. Said base is adapted to be mounted by any suitable means on the chassis of a wheeled truck of any suitable type, either powered or towed. The left end thereof, as viewed in FIG. 1, will be considered its forward end, and the side thereof facing the viewer in FIG. 1 will be considered its left side. Rigidly affixed to and extending upwardly from the left side corners of base 2, respectively at the forward and rearward ends thereof, are a pair of sturdy posts 4, said posts being inclined upwardly and outwardly from the left side of the base, and are parallel to each other. Each post is braced by a rigid strut 6 welded at its upper end to each of posts 4, adjacent the upper end thereof, and being inclined downwardly toward the right side of the base, being welded at its lower end to the corresponding right corner of said base. Base 2, posts 4 and struts 6 constitute the frame 7 of the dump bed assembly.

Mounted telescopingly on each post 4 for longitudinal movement thereon is a slide 8 which may have the form of a tubular box beam. Normally, said slide rests at its lower end on base 2, and extends upwardly coextensively with its post 4, as shown in FIG. 3. A longitudinal portion of the slide is cut away, as indicated at 10, in order that it may slide upwardly on its post for a substantial portion of its length without interference from the corresponding strut 6. Mounted in the upper end of each post 4, for rotation on a horizontal, fore-and-aft axis, is a roller 12 (see FIG. 6) which projects through a window 14 formed in said post to bear against the inner surface of the left or outer wall of the associated slide 8. Similarly, a roller 16 is carried rotatably by each slide 8 adjacent its lower end, projecting through a window 18 formed in said slide to bear against the exterior surface of the right or inner wall of the associated post 4, as shown in FIG. 7. These rollers facilitate the movement of the slides on the posts, as will appear. Slides 8 are interconnected by a pair of horizontal cross bars 20 extending therebetween and welded at their opposite ends to said slides. Slides 8, though cut away at 10 to accomodate struts 6 as already mentioned, do overlap the distal fore and aft surfaces of posts 4 in order to prevent any possible fore-and-aft spreading of said posts. Slides 8 and their cross bars 20 constitute the carriage 21 of the dump bed assembly.

Said carriage may be raised and lowered relative to the frame by moving slides 8 upwardly and downwardly on posts 4, which movement is accomplished by a pair of hydraulic rams 22 disposed respectively outwardly of each slide 8, parallel to said slide. The lower end of the cylinder 24 of each ram is pivoted, as at 26, to a pair of ears 28 affixed to the lower end of the associated post 4, which may be extended below the level of base 2, as shown. The upper end of the piston rod 30 is pivoted, as at 32, to a pair of ears 34 affixed to slide 8.

A dump bucket 36 is mounted in carriage 21. Said dump bucket normally rests on base 2, and in this position will be seen to have a horizontal floor 38, a vertical right side wall 40, a vertical front wall 42 disposed just rearwardly of front post 4, a vertical rear wall 44 disposed just forwardly of rear post 4, and left side wall 46 which is inclined upwardly and outwardly to the left, its upper edge being disposed outwardly from the left edge of base 2. Said dump bucket is pivoted to slides 8 on a horizontal, fore-and-aft axis adjacent its upper left edge, being provided at each of its front and rear edges with a stub axle 48 journalled in a bearing block 50 affixed to the outer side of the associated slide 8. The bucket is formed of sheet metal, and may have a reinforcing bar 52 welded to the left side thereof at the level of stub axles 48, said axles being mounted in said bar. The reinforcing bar also extends along the front and rear walls of the bucket, and vertically along the right corners thereof.

Said bucket may be tilted on axles 48 upwardly to the left to a substantially inverted position, as shown in dotted lines in FIG. 3. Preferably, it should be tiltable to a position wherein left side wall 46 thereof is inclined at least 45 degrees above horizontal, as shown, in order to insure efficient dumping of its contents. The tilting of the bucket is accomplished by a pair of hydraulic rams 54 disposed respectively in front of and behind bucket 36, externally thereof, and extending laterally. The cylinder 56 of each ram 54 is pivoted, as at 58, to a pair of ears 60 welded to the right or inner side of the associated slide 8 in spaced apart relation below bucket pivot 48. The piston rod 62 of each ram 54 is pivoted, as at 64, to a bracket 66 welded to the corresponding lower right corner of the bucket. All of rams 22 and 24 are double-acting, each being provided with two hydraulic connections 68 and 70 for interchangeably receiving hydraulic fluid from and returning it to any suitable pressure source, not shown, whereby each ram may be either extended or retracted. The hydraulic control system may also be standard, and is not shown. Preferably, the system is such that one ram of each pair is a "master" and the other a "slave", in order to insure that both rams of each pair will be extended or retracted equally and concurrently.

In operation, after the dump bucket has been loaded while in its normal upright position as shown in solid lines in FIG. 3, and transported to any desired delivery point, the bucket is first raised to any desired elevation by extending rams 22 as far as may be desired, in order that the bucket contents may be dumped into, for example, a truck bed which is higher than the normal elevation of the dump bucket. It is not practical to so construct the dump bed that it is always at a maximum elevation, both because of the resultant inconvenience of loading the bucket, and also since the greater height would render the dump truck laterally unstable to a possibly dangerous degree, and give the dump truck poor riding characteristics. It will be understood that the present dump bed is proportioned to provide a possible elevation of the bucket of about 6 feet, which is an ample range in all normal situations, although this figure is of course a matter of choice and design.

The extension of rams 22 of course raises carriage 21, which in turn supports the dump bucket, elevation of the carriage being accomplished by upward movement of slides 8 on posts 4. This movement is facilitated by rollers 12 and 16, rendering the post-slide contact an essentially rolling rather than sliding engagement, so long as the torque exerted by the bucket weight on slides 8 is counter-clockwise as viewed in FIG. 3. This condition prevails at virtually all positions of the bucket. Due to the inclination of posts 4, the bucket is moved to the left as it is elevated (to the right as viewed in FIG. 3). This moves the lip 72 of the bucket, over which its contents eventually will be poured, farther to the left.

After the bucket has been raised to the desired elevation by the extension of rams 22, rams 54 are extended to pivot the bucket on its axles 48, relative to carriage 21, to the dump position shown in dotted lines in FIG. 3, whereby its contents pour over its lip 72 into any desired receptacle. Since the bucket was moved to the left as it was elevated, its contents may thus be dumped into receiving receptacles spaced farther from the left side of the dump truck. This eliminates or greatly reduces any necessity that the dump truck driver must carefully "jockey" the dump truck into a position very close the the receiving receptacle. The amount of left transposition of the bucket lip during elevation of course depends on the degree of inclination of posts 4, which is a matter of design choice, and on the elevation to which the bucket is raised. In order that the bucket may be dumped at any selected height within the range of rams 22, it will be apparent that rams 22 must be operable independently of rams 54, although in some cases it may be desirable, in the interests of a faster dumping cycle, to extend both sets of rams simultaneously.

While I have shown and described a specific embodiment of my invention, it will be readily apparent that many minor changes of structure and operation could be made without departing from the spirit of the invention.

What I claim as new and desire to protect by Letters Patent is:

1. A dump truck bed comprising:
   a. a frame including a base adapted to be mounted on a wheeled truck chassis, and one or more rigid posts affixed to said base and projecting upwardly therefrom,
   b. a carriage mounted on said frame for vertical movement relative thereto, and including a generally tubular slide mounted telescopingly on each of said posts,
   c. a first power means operable to raise said carriage relative to said frame, said carriage elevating means comprising a hydraulic ram extending parallel to each of said posts and interconnecting said post to its associated slide,
   d. a normally upright dump bucket mounted in said carriage for pivotal movement relative thereto on a horizontal axis parallel to and adjacent one of its upper side edges, and
   e. a second power means operable to pivot said bucket relative to said carriage to a generally inverted position to dump its contents, said first and second power means being operable independently of each other whereby said bucket may be dumped at any desired position in its range of vertical movement.

2. A dump truck bed as recited in claim 1 wherein each of said posts is inclined upwardly from said base toward and beyond the side of said base at which the contents of the bucket will be dumped, all of said posts being parallel, whereby said carriage is moved both vertically and horizontally as it is elevated relative to said posts.

3. A dump truck bed as recited in claim 2 with the addition of:
   a. a roller carried at the upper end of each of said posts for rotation on an axis transverse to its direction of inclination and engaging the associated slide, and
   b. a roller carried at the lower end of each of said slides for rotation on an axis transverse to the direction of inclination of the associated post, and engaging said post.

4. A dump truck bed as recited in claim 2 with the addition of rollers carried respectively by each of said posts and its associated slide, the rollers of each of these members having rolling engagement with the other of said members.

5. A dump truck bed as recited in claim 1 wherein said bucket tilting means comprises one or more hydraulic rams each pivoted at one end to said carriage on an axis parallel to but spaced apart from the axis of the pivotal connection of said bucket to said carriage, and at its opposite end to said bucket at such a position that the ram axes are never disposed in a common plane with the bucket axis.

* * * * *